(12) United States Patent
Sethi et al.

(10) Patent No.: US 12,340,244 B2
(45) Date of Patent: Jun. 24, 2025

(54) DEVICE MANAGEMENT BASED ON DEGRADATION AND WORKLOAD

(71) Applicant: Dell Products L.P., Round Rock, TX (US)

(72) Inventors: Parminder Singh Sethi, Ludhiana (IN); Lakshmi Saroja Nalam, Bangalore (IN); Vasanth Sathyanarayanan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 457 days.

(21) Appl. No.: 17/695,466

(22) Filed: Mar. 15, 2022

(65) Prior Publication Data
US 2023/0297412 A1    Sep. 21, 2023

(51) Int. Cl.
| | |
|---|---|
| *G06F 9/48* | (2006.01) |
| *G06F 9/46* | (2006.01) |
| *G06F 9/50* | (2006.01) |
| *G06F 11/07* | (2006.01) |
| *G06F 11/20* | (2006.01) |

(Continued)

(52) U.S. Cl.
CPC .............. *G06F 9/48* (2013.01); *G06F 9/46* (2013.01); *G06F 9/4881* (2013.01); *G06F 9/5083* (2013.01); *G06F 11/0709* (2013.01); *G06F 11/0772* (2013.01); *G06F 11/2028* (2013.01);

(Continued)

(58) Field of Classification Search
CPC . G06F 9/46; G06F 9/48; G06F 9/4881; G06F 9/5083; G06F 11/0709; G06F 11/0772; G06F 11/2028; G06F 11/3006; G06F 11/3409
See application file for complete search history.

(56) References Cited

U.S. PATENT DOCUMENTS

| | | | |
|---|---|---|---|
| 2006/0184939 A1* | 8/2006 | Sahoo | G06F 9/505 718/100 |
| 2012/0117083 A1* | 5/2012 | Riepshoff | G06F 16/24556 707/E17.012 |
| 2020/0097358 A1* | 3/2020 | Mahindru | G06F 11/076 |
| 2020/0285503 A1* | 9/2020 | Dou | G06F 9/5072 |

(Continued)

OTHER PUBLICATIONS

J. Brownlee, "Time Series Forecasting With Prophet in Python," https://machinelearningmastery.com/time-series-forecasting-with-prophet-in-python/, Aug. 26, 2020, 33 pages.
Prophet, "Forecasting at Scale," https://facebook.github.io/prophet/, Accessed Feb. 25, 2022, 4 pages.

*Primary Examiner* — Charles M Swift
(74) *Attorney, Agent, or Firm* — Ryan, Mason & Lewis, LLP

(57) ABSTRACT

A method comprises generating a plurality of device trees for respective ones of a plurality of devices. The plurality of device trees respectively comprise a plurality of nodes corresponding to a device, one or more components of the device and one or more alerts associated with the one or more components. In the method, weights are assigned to the plurality of nodes of the plurality of device trees, and rates of degradation for the respective ones of the plurality of devices are computed based, at least in part, on the assigned weights. Workloads for the respective ones of the plurality of devices are predicted using one or more machine learning models, and a ranking of the respective ones of the plurality of devices is generated based, at least in part, on at least one of the rates of degradation and the predicted workloads.

20 Claims, 10 Drawing Sheets

(51) Int. Cl.
*G06F 11/30* (2006.01)
*G06F 11/34* (2006.01)

(52) U.S. Cl.
CPC ...... *G06F 11/3006* (2013.01); *G06F 11/3409* (2013.01)

(56) References Cited

U.S. PATENT DOCUMENTS

| | | | | |
|---|---|---|---|---|
| 2020/0371896 | A1* | 11/2020 | Mathur | G06F 11/3006 |
| 2021/0336879 | A1* | 10/2021 | Nguyen | H04L 45/02 |
| 2022/0261295 | A1* | 8/2022 | Nagaraja | G06F 18/23 |
| 2023/0161661 | A1* | 5/2023 | Higgins | G06F 11/0772 |
| | | | | 714/37 |

* cited by examiner

```
{
  "Device": {
    "importance": "Prod",
    "weight": 8
    "components": [
      {
        "name": "HDD",
        "weight": 20
      },
      {
        "name": "CPU",
        "weight": 30
      },
      {
        "name": "FAN",
        "weight": 5
      }
    ],
    "Alerts": [
      {
        "name": "warning",
        "weight": "2"
      },
      {
        "name": "critical",
        "weight": "4"
      },
      {
        "name": "Info",
        "weight": "1"
      }
    ]
  }
}
```

FIG. 3

| DEVICE IDENTIFIER | ALERT TYPE | DEGRADATION RATE |
|---|---|---|
| Device A | Warning | 50% |
| Device B | Warning | 35% |
| Device C | Warning | 20% |
| Device D | Warning | 5% |
| Device E | Warning | 2% |
| Device F | Healthy | 0% |

FIG. 5

DEVICE MANAGEMENT BASED ON DEGRADATION AND WORKLOAD

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to device management in such information processing systems.

BACKGROUND

Datacenters may include thousands to tens of thousands of devices. The devices may be spread across multiple locations in, for example, different buildings and geographic regions. In addition, the devices in a datacenter may respectively serve different purposes and needs of an enterprise, such that it is important for datacenter administrators to maintain the devices in active and healthy states while minimizing downtime.

SUMMARY

Embodiments provide a device management platform in an information processing system.

For example, in one embodiment, a method comprises generating a plurality of device trees for respective ones of a plurality of devices. The plurality of device trees respectively comprise a plurality of nodes corresponding to a device, one or more components of the device and one or more alerts associated with the one or more components. In the method, weights are assigned to the plurality of nodes of the plurality of device trees, and rates of degradation for the respective ones of the plurality of devices are computed based, at least in part, on the assigned weights. Workloads for the respective ones of the plurality of devices are predicted using one or more machine learning models, and a ranking of the respective ones of the plurality of devices is generated based, at least in part, on at least one of the rates of degradation and the predicted workloads.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts example pseudocode for a device weightage policy in an illustrative embodiment.

FIG. 5 depicts a table of device prioritization based on degradation rate in an illustrative embodiment.

DETAILED DESCRIPTION

Figure 1:
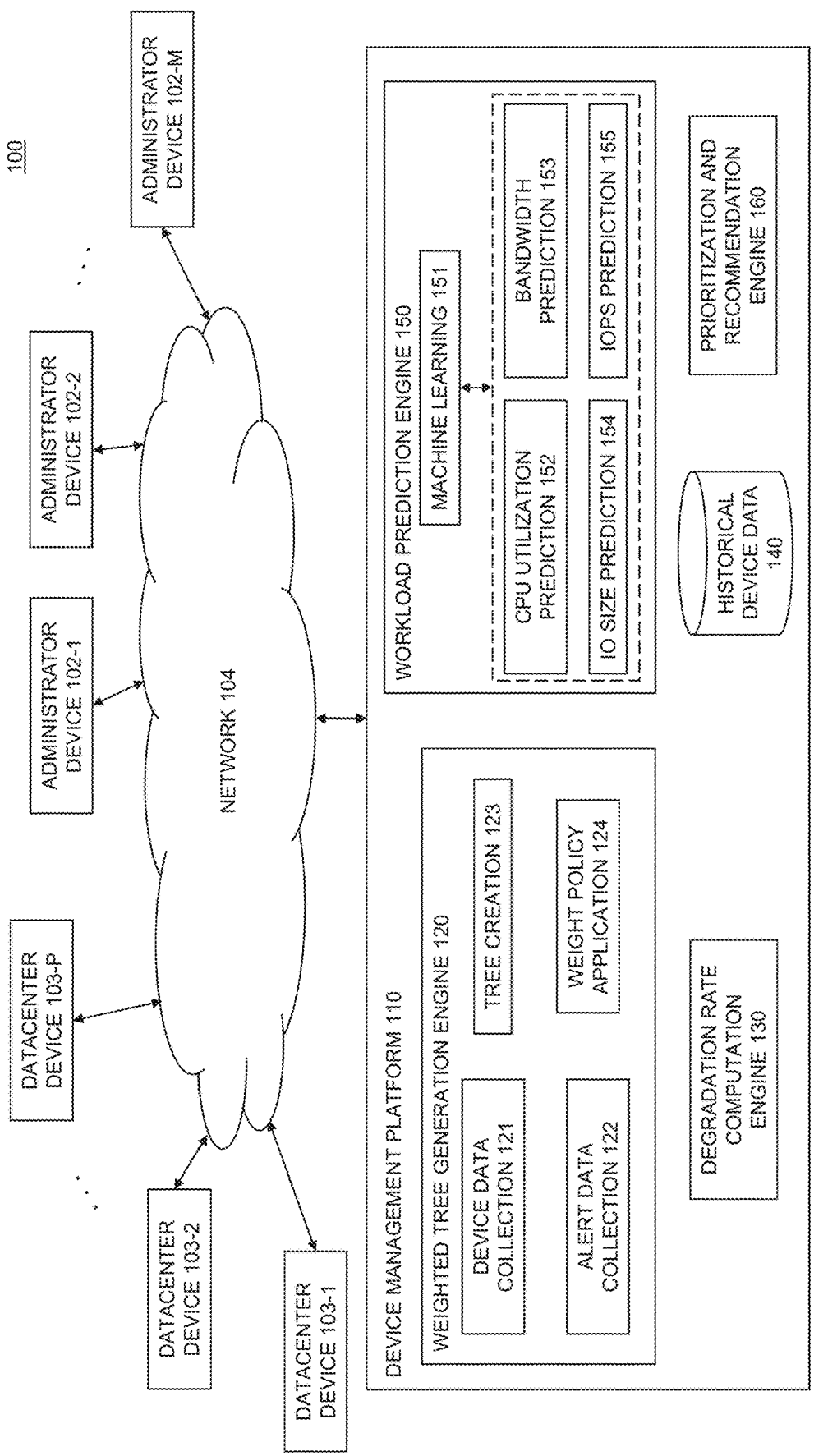
FIG. 1 depicts an information processing system with a device management platform for managing devices based on degradation and workload in an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses), networks or other elements of a computing environment that may fail or malfunction.

FIG. 1 shows an information processing system 100 configured in accordance with an illustrative embodiment. The information processing system 100 comprises administrator devices 102-1, 102-2, . . . 102-M (collectively "administrator devices 102") and datacenter devices 103-1, 103-2, . . . 103-P (collectively "datacenter devices 103"). The administrator devices 102 and datacenter devices 103 communicate over a network 104 with a device management platform 110. The variables M and P and other similar index variables herein such as K and L are assumed to be arbitrary positive integers greater than or equal to one.

The administrator devices 102 and datacenter devices 103 can comprise, for example, desktop, laptop or tablet computers, servers, host devices, storage devices, mobile telephones, Internet of Things (IoT) devices or other types of processing devices capable of communicating with the device management platform 110 over the network 104. Such devices are examples of what are more generally referred to herein as "processing devices." Some of these processing devices are also generally referred to herein as "computers." The administrator devices 102 and datacenter devices 103 may also or alternately comprise virtualized computing resources, such as virtual machines (VMs), containers, etc. The administrator devices 102 and/or datacenter devices 103 in some embodiments comprise respective computers associated with a particular company, organization or other enterprise. It is to be understood that although the embodiments are discussed in terms of datacenter devices 103, the embodiments are not necessarily limited thereto, and may be applied to different devices (e.g., customer or client devices) that are not necessarily part of and/or located in a datacenter.

The terms "user" or "administrator" herein are intended to be broadly construed so as to encompass numerous arrangements of human, hardware, software or firmware entities, as well as combinations of such entities. Device management services may be provided for users utilizing one or more machine learning models, although it is to be appreciated that other types of infrastructure arrangements could be used. At least a portion of the available services and functionalities provided by the device management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device management platform 110, as well as to support communication between the device management platform 110 and connected devices (e.g., administrator devices 102 and datacenter devices 103) and/or other related systems and devices not explicitly shown.

In some embodiments, the administrator devices 102 are assumed to be associated with repair and/or support technicians, system administrators, information technology (IT) managers, software developers, release management personnel or other authorized personnel configured to access and utilize the device management platform 110.

Device management applications to manage datacenter devices 103 may be used to provision the datacenter devices 103, monitor the health of the datacenter devices 103, and manage the lifecycle of the datacenter devices 103. In the case of health monitoring, a device management application may provide a user (e.g., administrator or information technology (IT) professional) with information on different health states for the devices. For example, the user may be informed of "warning" or "critical" states of the datacenter devices 103 indicating problems or issues with the datacenter devices 103. Such information can be useful for a user to proactively address the issues or problems. However, when there are multiple devices in the same state (e.g., "warning" state), information indicating the health state of a datacenter device 103 alone is not sufficient for users to prioritize and address device issues. For example, if a group of datacenter devices 103 are in a "warning" state, users lack sufficient information to determine which datacenter devices 103 in the group require prioritized attention.

Illustrative embodiments provide techniques to rank datacenter devices 103 that are in the same health state based on the degradation rate and predicted workload of the datacenter devices 103. Advantageously, the embodiments provide a device management platform 110 which decomposes each datacenter device 103 into a weighted device tree comprising the datacenter device 103 as the root node, the components of the datacenter device 103 as branch nodes (also referred to herein as "secondary nodes"), and corresponding alerts (e.g., critical, warning and information), if any, associated with respective ones of the components as leaf/end nodes (also referred to herein as "tertiary nodes"). According to an embodiment, in real-time, responsive to the collection of data corresponding to alerts associated with device components, an overall weight of respective datacenter devices 103 of a plurality of datacenter devices 103 is calculated based on the weight of the nodes of a corresponding device tree. A rate of degradation of the respective datacenter devices 103 is calculated and provided to a user (e.g., an administrator via one of the administrator devices 102), where it may be displayed by device management software running on the administrator device 102. Once the rate of degradation is determined for each datacenter device 103, the datacenter devices 103 are prioritized based on their degradation rates. In addition, the datacenter devices 103 are further prioritized based on their projected workloads and idle times over an upcoming time period (e.g., next 24 hours).

The device management platform 110 in the present embodiment is assumed to be accessible to the administrator devices 102 and datacenter devices 103 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the device management platform 110 includes a weighted tree generation engine 120, a degradation rate computation engine 130, a historical device data repository 140, a workload prediction engine 150 and a prioritization and recommendation engine 160. The weighted tree generation engine 120 includes a device data collection layer 121, an alert data collection layer 122, a tree creation layer 123 and a weight policy application layer 124. The workload prediction engine 150 includes a machine learning layer 151, a CPU utilization prediction layer 152, a bandwidth prediction layer 153, an input-output (IO) size prediction layer 154 and an input-outputs per second (IOPS) prediction layer 155.

The device data collection layer 121 collects information identifying the datacenter devices 103 and the components of the datacenter devices 103 and the alert data collection layer 122 collects information corresponding to alerts about the health status of the components of the datacenter devices 103. For example, if one or more of components is in a failure state, or where failure of the component is imminent, the alert may comprise a "critical" flag or other metadata indicator identifying a serious issue. If a component is experiencing problems (e.g., high latency, low bandwidth, excessive memory use, etc.), but remains operational, the alert may comprise a "warning" flag or other metadata indicator identifying a moderate issue that may lead to a more severe issue. If a component is not experiencing problems and is operational, a routine informational alert (e.g., a regularly scheduled alert on component status) may comprise an "informational" flag or other metadata indicator identifying no issues. The alerts may be issued automatically and sent to the device management platform 110 by device management software on the datacenter devices 103, and/or be issued as a result of IT support tickets issued by support personnel. Alerts may also comprise metadata tying the alerts to corresponding datacenter devices 103 and/or device components, the metadata comprising, for example, device and/or component identifiers. Similarly, the information identifying the datacenter devices 103 and the components of the datacenter devices 103 collected by the device data collection layer 121 includes metadata comprising, for example, device and component identifiers, and may be collected regardless of whether alerts have been issued.

Additionally, the device data collection layer 121 periodically collects performance data associated with the datacenter devices 103 such as, for example, data related to CPU utilization, device and/or component bandwidth, device and/or component IO sizes and device and/or component IOPS for certain time periods (e.g., years, months, weeks, days, hours, etc.). The data collected by the device data collection layer 121 includes historical performance and configuration data of the datacenter devices 103 that may have been compiled and stored on the datacenter devices 103 and/or in an external database. Such data collected by the device data collection layer 121 is stored in the historical device data repository 140. Alternatively, performance and configuration data of the datacenter devices 103 may be collected by the device data collection layer 121 over time (e.g., over the past year), compiled by the device management platform 110 and stored in the historical device data repository 140. As explained in more detail herein, the historical performance and configuration from the historical device data repository 140 is used as an input for the machine learning layer 151 of the workload prediction engine 150 to predict workloads and idle times of the datacenter devices 103 based on different performance metrics.

Figure 2:
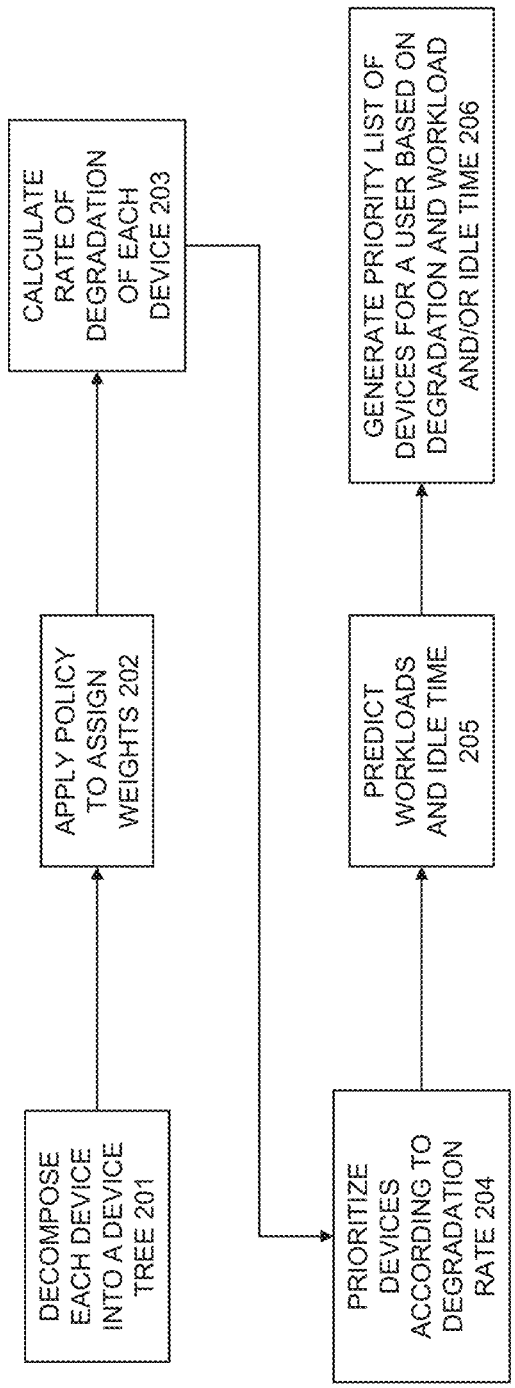
FIG. 2 depicts an operational flow for device management in an illustrative embodiment.

Referring to FIG. 2, which depicts an operational flow 200 for device management, each datacenter device 103 of a plurality of datacenter devices 103 under analysis is decomposed into a device tree (block 201) and a policy is applied to assign weights to nodes of the device trees (block 202). For example, referring to the weighted device trees 401, 402 and 403 in FIG. 4, the tree creation layer 123 of the weighted tree generation engine 120 creates device trees with devices (e.g., Device 1, Device 2 and Device 3) as root nodes, components (e.g., hard disk drives (HDDs), CPUs, fans, etc.) as branch nodes (secondary nodes) and alerts (e.g., critical, warning, informational (info)) as leaf/end nodes (tertiary nodes).

Figure 4:
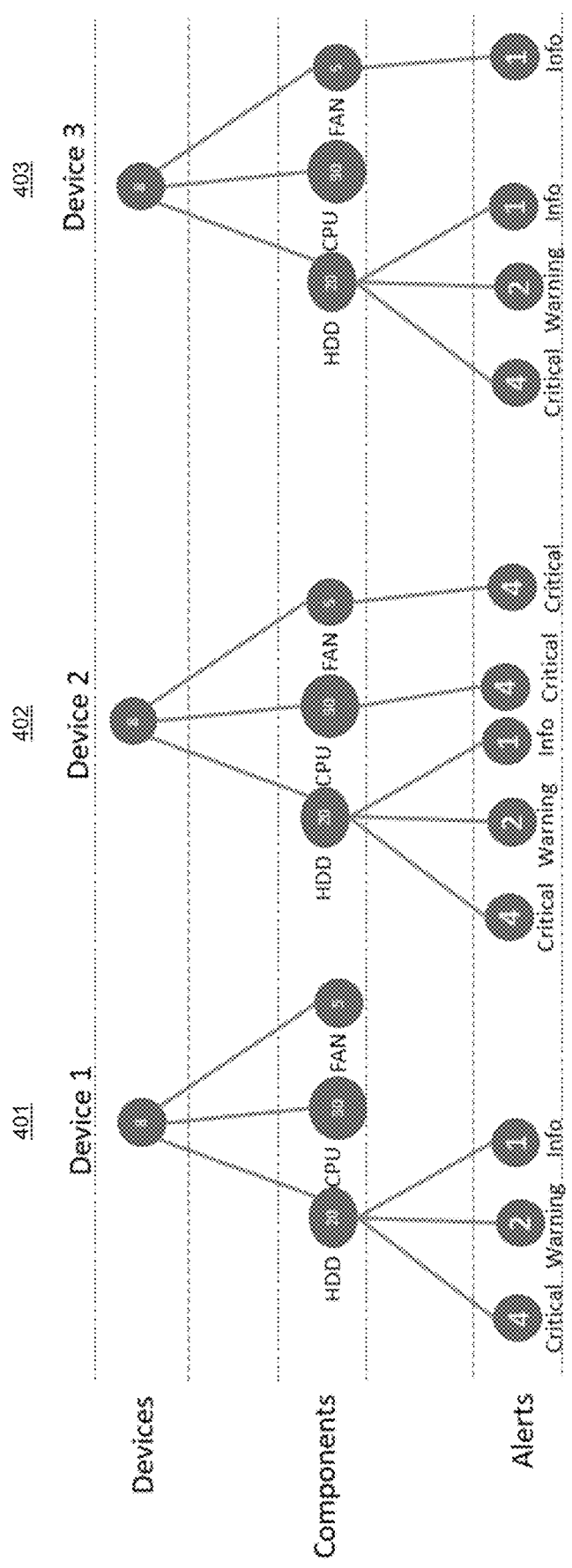
FIG. 4 depicts a plurality of weighted device trees in an illustrative embodiment.

As can be seen in FIG. 4, in some instances, there are no alerts (tertiary nodes) extending from components (secondary nodes), and in other instances, there are one or more tertiary nodes extending from the secondary nodes. For example, the HDD secondary nodes in the device trees 401 and 402 each have three tertiary nodes (alerts) extending therefrom, the CPU secondary nodes in the device trees 401 and 403 and the FAN secondary node in device tree 401 have no tertiary nodes extending therefrom, and the CPU secondary node in device tree 402 and the FAN secondary node in device tree 403 each have one tertiary node extending therefrom. In the case of no alerts corresponding to a given component, no tertiary nodes will extend from the node representing the given component.

The weight policy application layer 124 assigns weights to nodes of the device trees. For example, as can be seen in FIG. 4, weight policy application layer 124 assigns the device nodes, component nodes and alert nodes different weights according to a weightage policy that, for example, gives higher weight to components and alerts deemed to be of higher importance. As shown in FIG. 4, alert nodes of higher severity levels are assigned higher weight. For example, critical alert nodes are assigned higher weight (e.g., 4) than warning alert nodes (e.g., 2), which are assigned higher weight than info alert nodes (e.g., 1). In the case of component nodes, components deemed of higher importance than other components are assigned higher weight. For example, CPUs are assigned higher weight (e.g., 30) than HDDs (e.g., 20), which are assigned higher weight than fans (e.g., 5). For example, importance may be determined based on whether a device can continue to operate or operate effectively if the component fails. Devices are also assigned weights based on their importance. For example, a single device that controls multiple devices may be of higher importance than a device that is one of several redundant devices, and therefore assigned higher weight. In the device trees 401, 402 and 403, each of Device 1, Device 2 and Device 3 are of equal weight (e.g., 8).

In some cases, if a component is redundant (e.g., there are other duplicate components), the redundant component may have a lower weight than the non-redundant component even though that component would normally be weighted higher than the non-redundant component. For example, if a device has multiple CPUs, the CPUs in this instance may be weighted lower than the HDDs.

FIG. 3 depicts example pseudocode 300 for a device weightage policy. Consistent with the device trees 401, 402 and 403, the pseudocode 300 indicates that devices identified with a metadata "importance" label=production ("Prod") are given a weight of 8, components identified with metadata "name" labels of "HDD," "CPU," and "FAN" are given weights of 20, 30 and 5, respectively, and alerts identified with metadata "name" labels of "warning," "critical," and "info" are given weights of 2, 4 and 1, respectively.

Referring back to FIG. 2, at block 203 of the operational flow 200, a rate of degradation is calculated for each datacenter device 103. For example, based on the weights of the nodes in the device trees (e.g., device trees 401, 402 and 403) the degradation rate computation engine 130 computes a rate of device degradation for each datacenter device 103. For example, a total weight of the tertiary nodes corresponding to the alerts for a given device is calculated according to the following formula (1):

Total Weight$_{Tertiary}$=WTN$_{Critical}$×Number of Critical Alerts+WTN$_{Warning}$×Number of Warning Alerts+WTN$_{Info}$×Number of Info Alerts   (1)

WTN=tertiary node weight for a given alert. For example, referring to FIG. 4, in the case of Device 1, the total weight of the tertiary nodes is: 4*1+2*1+1*1=7, and all of the tertiary nodes correspond to the HDD component node. In the case of Device 2, the total weight of the tertiary nodes is: 4*3+2*1+1*1=15, with a first total tertiary node weight of 7 corresponding to the HDD component node, a second total tertiary node weight of 4 corresponding to the CPU component node and a third total tertiary node weight of 4 corresponding to the FAN component node. In the case of Device 3, the total weight of the tertiary nodes is: 4*1+2*1+ 1*2=8, with a first total tertiary node weight of 7 corresponding to the HDD component node, a second total tertiary node weight of 1 corresponding to the FAN component node.

The total weight of a secondary node from which tertiary nodes extend (in the Device 1 example, HDD) is calculated by multiplying the total weight of the tertiary nodes for that particular secondary node by the assigned weight to the component represented by the particular secondary node (in the Device 1 example, Total Weight$_{Tertiary}$ (7)×Assigned Weight$_{HDD}$ (20)=140). The weight of the other two component nodes for Device 1 (CPU and Fan) are not included in the calculation because they do not have any alerts extending therefrom. In the Device 2 example, the total weight of the CPU node is Total Weight$_{Tertiary}$ (4)×Assigned Weight$_{CPU}$ (30)=120 and the total weight of the FAN node is Total Weight$_{Tertiary}$ (4)×Assigned Weight$_{FAN}$ (5)=20. In the Device 3 example, the total weight of the FAN node is Total Weight$_{Tertiary}$ (1)×Assigned Weight$_{FAN}$ (5)=5. The total weights of the HDD nodes for Devices 2 and 3 is the same as that for Device 1.

The overall weight of a device is calculated by multiplying the sum of the total weight(s) of the secondary nodes by the device weight. In some cases, as in the Device 1 example, there may be only one secondary node total weight to consider. For example, in connection with Device 1, the overall device weight is Total Weight$_{Secondary}$ (140)×Assigned Weight$_{Device\ 1}$(8)=1120. In connection with Device 2, the overall device weight is Total Weight$_{Secondary}$ (140+120+ 20)×Assigned Weight$_{Device\ 1}$(8)=2240. In connection with Device 3, the overall device weight is Total Weight$_{Secondary}$ (140+5)×Assigned Weight$_{Device\ 1}$(8)=1160.

After computing the overall weight of a datacenter device 103, the rate of the degradation is calculated using the following formula (2):

$$\text{Rate of degradation} = \left(\frac{DW1}{DW2} - 1\right) \times 100 \qquad (2)$$

wherein, DW1=current overall device weight, and DW2=previous overall device weight. Assuming the previous overall device weight of Devices 1, 2 and 3 was 800, then the degradation rate for Device 1 is ((1120/800)−1)* 100=40%, for Device 2 is ((2240/800)−1)*100=180% and for Device 3 is ((1160/800)−1)*100=45%.

Referring back to the operational flow in FIG. 2, at block 204, the datacenter devices 103 are prioritized according to degradation rate. For example, the prioritization and recommendation engine 160 ranks the datacenter devices 103 according to their computed degradation rates as per the algorithm described hereinabove. FIG. 5 depicts a table 500 of device prioritization based on degradation rate. As can be seen in the table 500 the devices A-F are listed in descending order of degradation rate. Some of the devices correspond to the same alert type. For example, Devices A-E all correspond to "Warning" alerts, but are further distinguished from each other based on their respective degradation rates. As a result, due to its higher degradation rate, Device A may be treated with higher priority than Device B even though they both have the same alert type. Such information can be transmitted to administrators via interfaces on their administrator devices 102 so that they can understand the device distinctions based on their respective degradation rates and take appropriate action.

In some instances, the degradation rates and the alert types for the datacenter devices 103 may be the same. In this case, the device management platform 110 further includes the workload prediction engine 150, which uses one or more machine learning models to predict workloads and/or idle time periods for the datacenter devices 103. The predicted workloads and/or idle time periods can be used as further criteria for ranking the datacenter devices 103 to determine which of the datacenter devices should receive priority attention in the case of issues with one or more device components.

For example, referring to blocks 205 and 206 of the operational flow 200 in FIG. 2, workloads and idle time periods for the datacenter devices 103 are predicted and a priority list of the datacenter devices 103 is generated for a user based on multiple factors including degradation rate and predicted workload and/or predicted idle time periods. In more detail, the workload prediction engine 150 predicts workload and idle time of each datacenter device 103 using a machine learning model than employs time series forecasting. For example, the machine learning model predicts the workload and idle time of a device based on historical performance and configuration data of a device inputted to the machine learning layer 151 from the historical device data repository 140. The historical performance and configuration data can be over a predetermined historical time period (e.g., over the last 3 months, 6 months, year or other time period). This machine learning model predicts the workload and idle time of a given datacenter device 103 for an upcoming time period (e.g., the next 24 hours, 48 hours, 72 hours, week, etc.). The prediction is based on forecasting performance metrics such as, but not necessarily limited to, CPU utilization, device bandwidth, device IO size, and device IOPS, as predicted by the CPU utilization prediction layer 152, bandwidth prediction layer 153, IO size prediction layer 154, and IOPS prediction layer 155, respectively, in conjunction with the machine learning layer 151. After determining the performance metric forecasts, the workload prediction engine 150 determines the impact of each metric on each other, and identifies idle time durations of the datacenter devices 103.

The machine learning model is robust to missing data and shifts in trends, and is configured to handle outliers. This machine learning model facilitates forecasting of time series data based on an additive model where non-linear trends are fit with yearly, weekly, and daily seasonality, as well as holiday effects. The machine learning model is configured to automatically find a set of hyperparameters for the model for making data forecasts with trends and seasonal structure. The machine learning model is used to predict the performance metrics of the datacenter devices 103. A non-limiting example of the machine learning model includes the Prophet algorithm, which is an open-source time series forecasting model.

Figure 6:
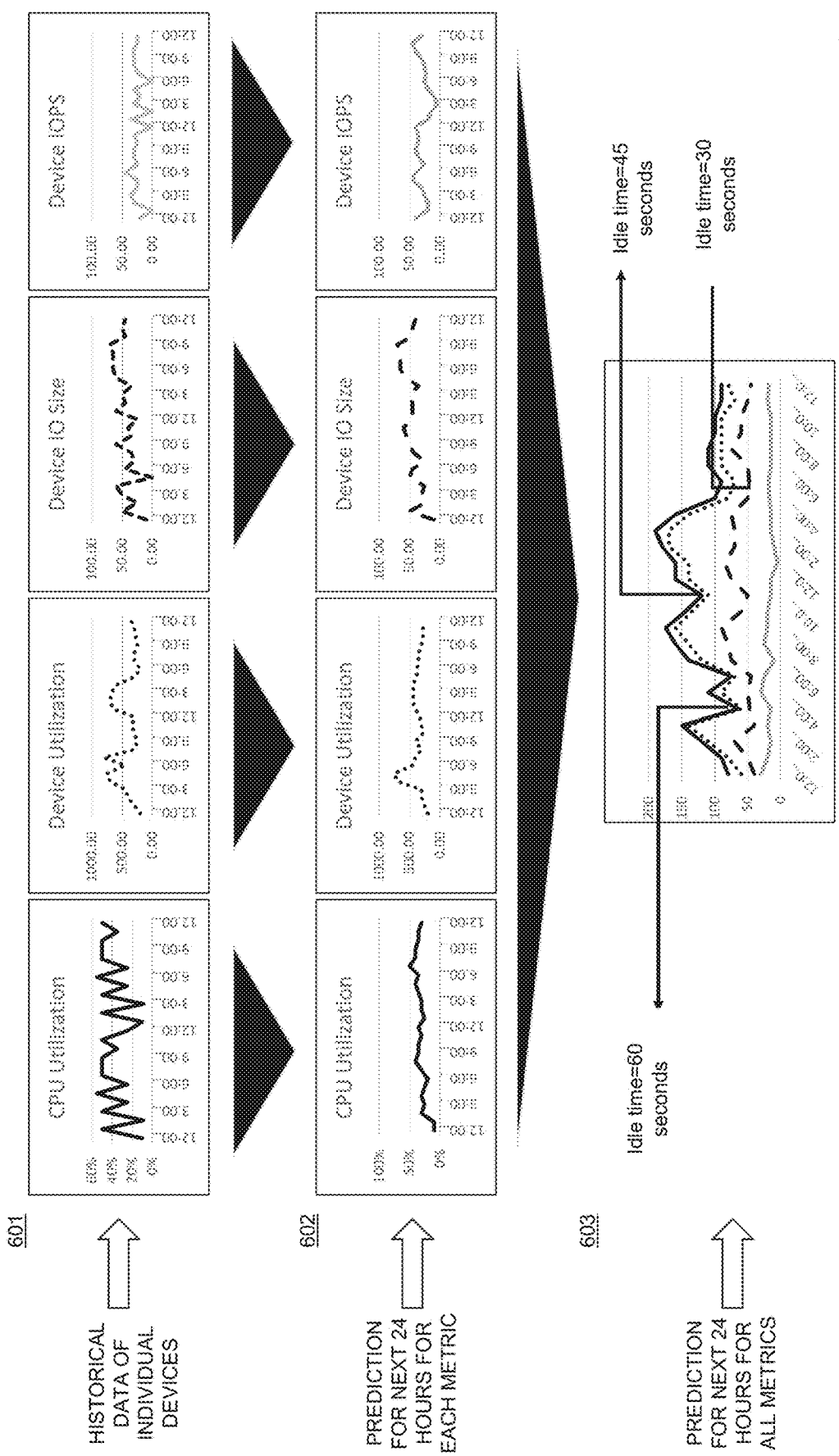
FIG. 6 depicts stages of workload and idle time prediction in an illustrative embodiment.

FIG. 6 depicts stages 601, 602 and 603 of workload and idle time prediction, and describes how the workload prediction engine 150 uses the historical data to forecast performance metrics (e.g., CPU utilization, device bandwidth, device IO size, and device IOPS) for a future period of 24 hours. For example, in the first stage 601, historical performance data of individual devices in connection with CPU utilization, device bandwidth, device IO size, and device IOPS is collected and input to the machine learning model. Referring to stage 2 602, the machine learning model predicts the CPU utilization, device bandwidth, device IO size, and device IOPS over the next 24 hours for a given datacenter device 103. Then, in stage 3 603, the workload prediction engine 150 determines the impact of each performance metric on each other, and identifies idle time durations of a datacenter device 103 for the next 24 hours. The four lines in the graph in stage 3 603 represent each of the predicted performance metrics for the next 24 hours. As can be seen in stage 3 603, idle times of 60 seconds, 45 seconds and 30 seconds at different time periods are predicted based on the aggregation of the predicted performance metrics.

There is a possibility that the degradation rate of one or more datacenter devices 103 having the same health state and corresponding alert type (e.g., "Warning") is the same or in the same range. In this case, the datacenter devices 103 with the same or similar degradation rates are further prioritized based on the predicted workload and/or predicted idle time periods of the datacenter devices 103.

Figure 7B:
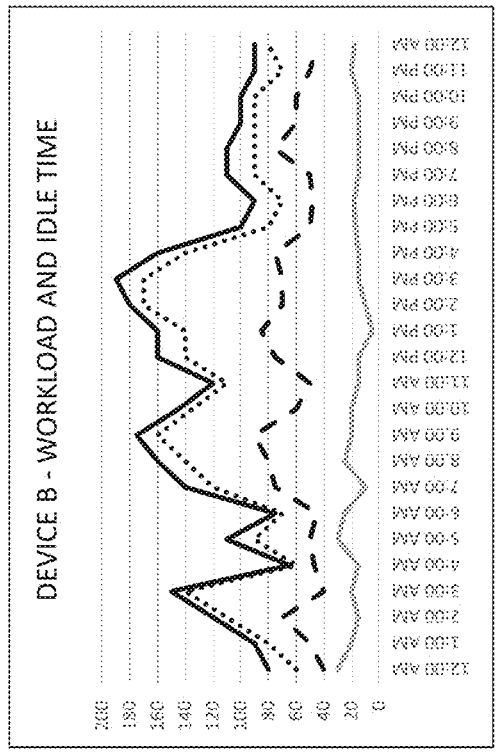
FIG. 7B depicts a plot of workload and idle time for a second device in an illustrative embodiment.
Figure 7A:
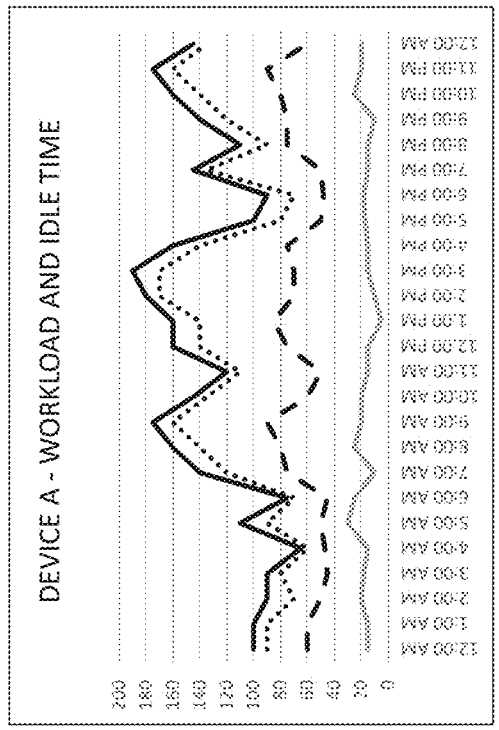
FIG. 7A depicts a plot of workload and idle time for a first device in an illustrative embodiment.

For example, the graphs 701 and 702 in FIGS. 7A and 7B show predicted workload and predicted idle time for Devices A and B according to the performance metrics discussed hereinabove (e.g., CPU utilization, device bandwidth, device IO size, and device IOPS). In this non-limiting example, Devices A and B are assumed to be degrading at the same percentage rate. The workload prediction engine 150 has determined the workload and idle time predictions of these devices as shown in FIGS. 7A and 7B. As can be seen from a comparison of the graphs 701 and 702, Device B has more workload and less idle time in the next 24 hours than Device A. Accordingly, due to the higher workload and less idle time, there is a possibility that Device B will degrade at a higher speed than Device A. Accordingly, based on this data, the prioritization and recommendation engine 160 prioritizes Device B to be attended to before Device A, and transmits such a recommendation to an administrator via one of the administrator devices 102. The transmitted information can include priority rankings of multiple datacenter devices 103 based on degradation rate, predicted workload and/or predicted idle time, along with visualizations such as tables like table 500 in FIG. 5, the graphs in stages 601, 602 and 603 of FIG. 6 and/or the graphs 701 and 702 in FIGS. 7A and 7B.

In addition, the device management platform 110 performs one or more automated actions based at least in part on the ranking. For example, the device management platform 110 uses the ranking to automatically prioritize support operations of a plurality of datacenter devices 103, and to automatically perform remedial operations to address one or more issues that caused the component alerts. The remedial operations are performed in an order based on the ranking, and include, but are not necessarily limited to, automatically modifying configurations of the datacenter devices 103, automatically switching operations from a failed component of a datacenter device 103 to a redundant component of the datacenter device 103 if such a redundant component is available, ceasing operations on a particular datacenter device 103 or component thereof, automatically generating and transmitting additional alerts and/or IT support tickets to one of the administrator devices 102, and/or automatically uploading remedial code, firmware, upgrades and/or other applications and software to the datacenter devices 103 to respond to the alerts in an appropriate order based on the ranking.

According to one or more embodiments, the historical device data repository 140 and other data repositories or databases referred to herein can be configured according to a relational database management system (RDBMS) (e.g., PostgreSQL). In some embodiments, the historical device data repository 140 and other data repositories or databases referred to herein are implemented using one or more storage systems or devices associated with the device management platform 110. In some embodiments, one or more of the storage systems utilized to implement the historical device data repository 140 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device management platform 110, the weighted tree generation engine 120, degradation rate computation engine 130, historical device data repository 140, workload prediction engine 150 and/or prioritization and recommendation engine 160 in other embodiments can be implemented at least in part externally to the device management platform 110, for example, as stand-alone servers, sets of servers or other types of systems coupled to the network 104. For example, the weighted tree generation engine 120, degradation rate computation engine 130, historical device data repository 140, workload prediction engine 150 and/or prioritization and recommendation engine 160 may be provided as cloud services accessible by the device management platform 110.

The weighted tree generation engine 120, degradation rate computation engine 130, historical device data repository 140, workload prediction engine 150 and/or prioritization and recommendation engine 160 in the FIG. 1 embodiment are each assumed to be implemented using at least one processing device. Each such processing device generally comprises at least one processor and an associated memory, and implements one or more functional modules for controlling certain features of the weighted tree generation engine 120, degradation rate computation engine 130, historical device data repository 140, workload prediction engine 150 and/or prioritization and recommendation engine 160.

At least portions of the device management platform 110 and the elements thereof may be implemented at least in part in the form of software that is stored in memory and executed by a processor. The device management platform 110 and the elements thereof comprise further hardware and software required for running the device management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the weighted tree generation engine 120, degradation rate computation engine 130, historical device data repository 140, workload prediction engine 150, prioritization and recommendation engine 160 and other elements of the device management platform 110 in the present embodiment are shown as part of the device management platform 110, at least a portion of the weighted tree generation engine 120, degradation rate computation engine 130, historical device data repository 140, workload prediction engine 150, prioritization and recommendation engine 160 and other elements of the device management platform 110 in other embodiments may be implemented on one or more other processing platforms that are accessible to the device management platform 110 over one or more networks. Such elements can each be implemented at least in part within another system element or at least in part utilizing one or more stand-alone elements coupled to the network 104.

It is assumed that the device management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the weighted tree generation engine 120, degradation rate computation engine 130, historical device data repository 140, workload prediction engine 150, prioritization and recommendation engine 160 and other elements of the device management platform 110, and the elements thereof can each be implemented in the form of one or more LXCs running on one or more VMs. Other arrangements of one or more processing devices of a processing platform can be used to implement the weighted tree generation engine 120, degradation rate computation engine 130, historical device data repository 140, workload prediction engine 150 and prioritization and recommendation engine 160, as well as other elements of the device management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the device management platform 110 to reside in different data centers. Numerous other distributed implementations of the device management platform 110 are possible.

Accordingly, one or each of the weighted tree generation engine 120, degradation rate computation engine 130, historical device data repository 140, workload prediction engine 150, prioritization and recommendation engine 160 and other elements of the device management platform 110 can each be implemented in a distributed manner so as to comprise a plurality of distributed elements implemented on respective ones of a plurality of compute nodes of the device management platform 110.

It is to be appreciated that these and other features of illustrative embodiments are presented by way of example only, and should not be construed as limiting in any way. Accordingly, different numbers, types and arrangements of system elements such as the weighted tree generation engine 120, degradation rate computation engine 130, historical device data repository 140, workload prediction engine 150, prioritization and recommendation engine 160 and other elements of the device management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the device management platform can be offered to cloud infrastructure customers or other users as part of FaaS, CaaS and/or PaaS offerings.

Figure 8:
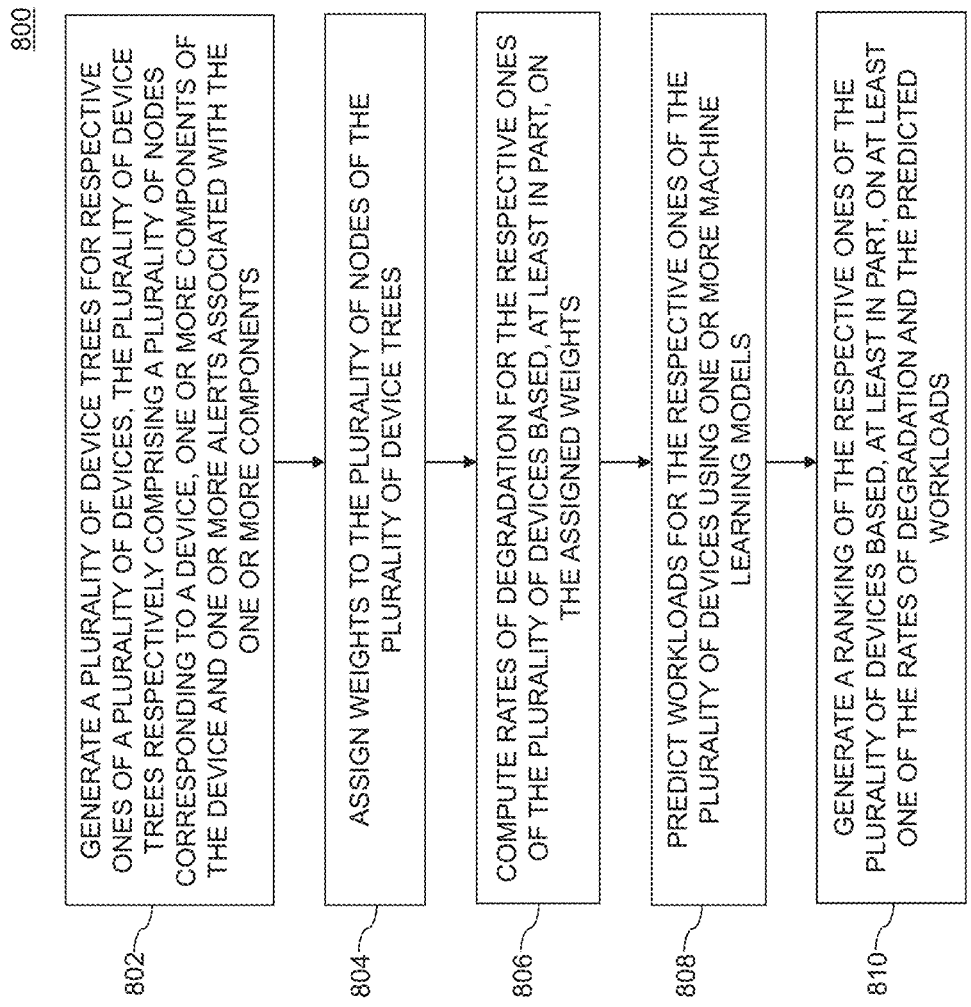
FIG. 8 depicts a process for device management based on degradation and workload according to an illustrative embodiment.

The operation of the information processing system 100 will now be described in further detail with reference to the flow diagram of FIG. 8. With reference to FIG. 8, a process 800 for device management based on degradation and workload as shown includes steps 802 through 810, and is suitable for use in the system 100 but is more generally applicable to other types of information processing systems comprising a device management platform configured for device management.

In step 802, a plurality of device trees for respective ones of a plurality of devices are generated. The plurality of device trees respectively comprise a plurality of nodes corresponding to a device, one or more components of the device and one or more alerts associated with the one or more components. The plurality of nodes for respective ones of the plurality of device trees comprise a root node corresponding to the device, one or more secondary nodes corresponding to the one or more components and extending from the root node, and one or more tertiary nodes corresponding to the one or more alerts and extending from the one or more secondary nodes.

In step 804, weights are assigned to the plurality of nodes of the plurality of device trees. In step 806, rates of degradation for the respective ones of the plurality of devices are computed based, at least in part, on the assigned weights. In step 808, workloads for the respective ones of the plurality of devices are predicted using one or more machine learning models. In step 810, a ranking of the respective ones of the plurality of devices is generated based, at least in part, on at least one of the rates of degradation and the predicted workloads. The ranking may be based, at least in part, on a combination of the rates of degradation, the predicted workloads and one or more types of the one or more alerts. The ranking is transmitted to at least one user device.

Respective ones of the one or more alerts comprise a level of criticality based, at least in part, on one or more health states of the one or more components corresponding to the respective ones of the one or more alerts. The weights assigned to the one or more tertiary nodes are based, at least in part, on the level of criticality of the one or more alerts corresponding to the one or more tertiary nodes. The weights assigned to the root node and to the one or more secondary nodes are based, at least in part, on pre-determined importance of the device and of the one or more components of the device.

The computing of the rates of degradation for the respective ones of the plurality of devices comprises computing respective total weights of the one or more tertiary nodes extending from respective ones of the one or more secondary nodes, computing respective total weights of the respective ones of the one or more secondary nodes based, at least in part, on the respective total weights of the one or more tertiary nodes, computing an overall device weight based, at least in part, on the respective total weights of the respective ones of the one or more secondary nodes, and computing a ratio between the overall device weight and a previous device weight. The computing of the respective total weights of the respective ones of the one or more secondary nodes comprises computing respective products of the respective total weights of the one or more tertiary nodes and the weights assigned to the respective ones of the one or more secondary nodes. The computing of the overall device weight comprises computing respective products of the respective total weights of the respective ones of the one or more secondary nodes and the weight assigned to the root node.

The one or more machine learning models comprises a time series forecasting model and the predicting is based, at least in part, on historical performance data of the respective ones of the plurality of devices. One or more idle time periods for the respective ones of the plurality of devices are predicted using the one or more machine learning models. According to an embodiment, he steps of the method are executed in real-time responsive to collection of data corresponding to the one or more alerts for respective ones of a plurality of devices.

It is to be appreciated that the FIG. 8 process and other features and functionality described above can be adapted for use with other types of information systems configured to execute device management services in a device management platform or other type of platform.

The particular processing operations and other system functionality described in conjunction with the flow diagram of FIG. 8 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 8 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device management platform as disclosed herein can provide a number of significant advantages relative to conventional arrangements. For example, the device management platform effectively identifies datacenter devices that require immediate attention based on the degradation rates and predicted workloads of the devices. As an additional advantage, the embodiments provide techniques for ranking devices not only based on health states, but further based on degradation rate, predicted workload and predicted idle times. As a result, when alerts are at the same level, the embodiments allow for prioritized attention to devices degrading at faster rates and having higher workloads, thus preventing unwanted downtime.

As an additional advantage, given that datacenters may include thousands to tens of thousands of devices receiving alerts a given time which may require real-time attention, the embodiments provide for automated categorization and decomposition of the devices and their components into weighted device trees. Based on the weights assigned to the tree nodes, wherein the device is the root node, the device components correspond to secondary nodes, and alerts corresponding to each component correspond to tertiary nodes, the embodiments compute the degradation rate of each device as a real-time response to the alerts.

As a further advantage, the embodiments utilize one or more machine learning techniques to predict upcoming workloads and idle time of the devices to further define the support priority of the devices. Moreover, the embodiments provide a proactive method to find existing lower priority support tickets which may have a high possibility of changing into higher priority tickets due to degradation rate, high workload and/or minimal idle time.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the device management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device management platform in illustrative embodiments. These and other cloud-based systems in illustrative embodiments can include object stores.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
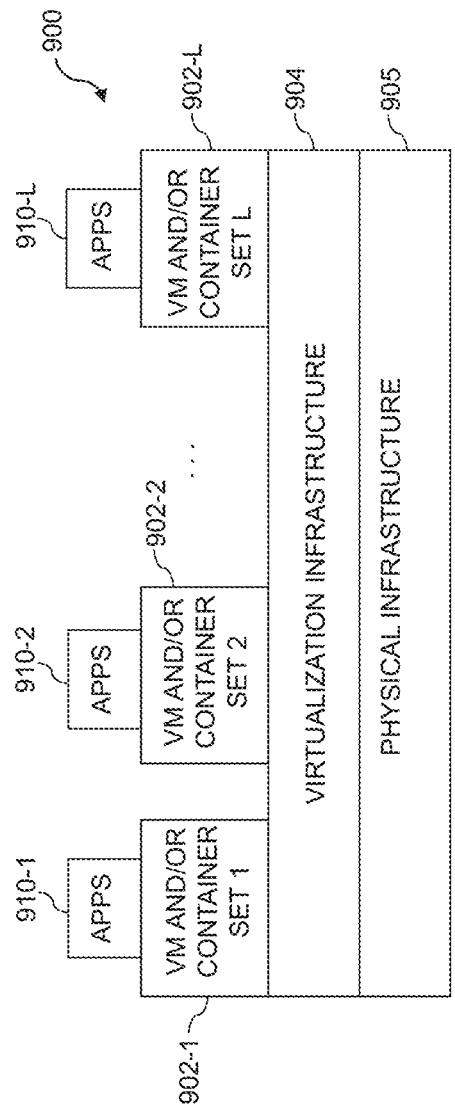
FIGS. 9 and 10 show examples of processing platforms that may be utilized to implement at least a portion of an information processing system according to illustrative embodiments.
Figure 10:
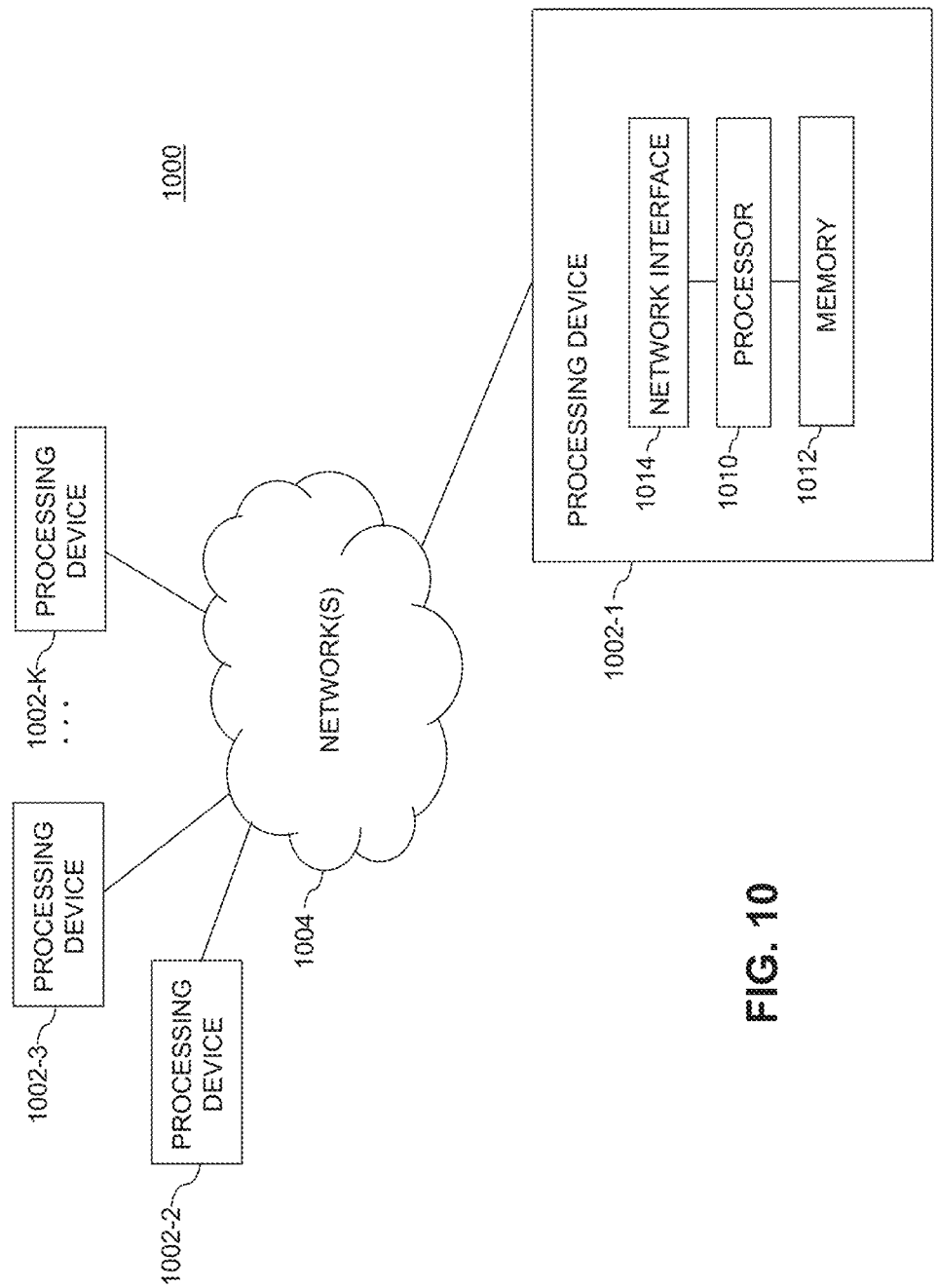

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012. The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the device management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
generating a plurality of device trees for respective ones of a plurality of devices in a datacenter, the plurality of device trees respectively comprising a plurality of nodes corresponding to a device, one or more components of the device and one or more alerts associated with the one or more components, the plurality of device trees including at least a first device tree generated for a first device in the datacenter, the first device tree comprising at a first level a root node representing the first device, at a second level a plurality of component nodes each coupled to the root node and each representing a different component of the first device, and at a third level a plurality of alert nodes each coupled to a corresponding one of the component nodes and each representing a different type of alert generated for the component represented by the corresponding component node, the plurality of device trees further including a second device tree generated for a second device in the datacenter, the second device being different than the first device, the second device tree having a root node, component nodes and alert nodes at respective first, second and third levels of the second device tree;

assigning weights to the plurality of nodes of the plurality of device trees, wherein assigning weights comprises, for a given one of the first and second device trees generated for the respective first and second devices, assigning a weight of a first set of weights to the root node, assigning weights of a second set of weights to respective component nodes at the second level of the given device tree, and assigning weights of a third set of weights to respective alert nodes at the third level of the given device tree;

computing rates of degradation for the respective ones of the plurality of devices based, at least in part, on the assigned weights, wherein for the given device tree, a rate of degradation is computed for the corresponding first or second device based at least in part on total weights of respective ones of the component nodes, wherein the total weight of a particular one of the component nodes is computed at least in part as a function of the weight assigned from the second set of weights to the particular component node and the weights assigned from the third set of weights to respective ones of the alert nodes coupled to the particular component node;

predicting workloads for the respective ones of the plurality of devices using one or more machine learning models;

generating a ranking of the respective ones of the plurality of devices based, at least in part, on at least one of the rates of degradation and the predicted workloads; and managing the devices based at least in part on the generated ranking;

wherein the steps of the method are executed by a processing device operatively coupled to a memory.

2. The method of claim 1 further comprising transmitting the ranking to at least one user device.

3. The method of claim 1 wherein the plurality of nodes for respective ones of the plurality of device trees comprise a root node corresponding to the device, one or more secondary nodes corresponding to the one or more components and extending from the root node, and one or more tertiary nodes corresponding to the one or more alerts and extending from the one or more secondary nodes.

4. The method of claim 3 wherein the one or more components comprise at least one of a storage device, a central processing unit (CPU) and a fan.

5. The method of claim 3 wherein respective ones of the one or more alerts comprise a level of criticality based, at least in part, on one or more health states of the one or more components corresponding to the respective ones of the one or more alerts.

6. The method of claim 5 wherein the weights assigned to the one or more tertiary nodes are based, at least in part, on the level of criticality of the one or more alerts corresponding to the one or more tertiary nodes.

7. The method of claim 3 wherein the weights assigned to the root node and to the one or more secondary nodes are based, at least in part, on pre-determined importance of the device and of the one or more components of the device.

8. The method of claim 3 wherein the computing of the rates of degradation for the respective ones of the plurality of devices comprises:

computing respective total weights of the one or more tertiary nodes extending from respective ones of the one or more secondary nodes;

computing respective total weights of the respective ones of the one or more secondary nodes based, at least in part, on the respective total weights of the one or more tertiary nodes; and computing an overall device weight based, at least in part, on the respective total weights of the respective ones of the one or more secondary nodes.

9. The method of claim 8 wherein the computing of the rates of degradation for the respective ones of the plurality of devices further comprises computing a ratio between the overall device weight and a previous device weight.

10. The method of claim 8 wherein the computing of the respective total weights of the respective ones of the one or more secondary nodes comprises computing respective products of the respective total weights of the one or more tertiary nodes and the weights assigned to the respective ones of the one or more secondary nodes.

11. The method of claim 8 wherein the computing of the overall device weight comprises computing respective products of the respective total weights of the respective ones of the one or more secondary nodes and the weight assigned to the root node.

12. The method of claim 1 wherein the one or more machine learning models comprise a time series forecasting model and the predicting is based, at least in part, on historical performance data of the respective ones of the plurality of devices.

13. The method of claim 1 further comprising predicting one or more idle time periods for the respective ones of the plurality of devices using the one or more machine learning models.

14. The method of claim 1 wherein the ranking of the respective ones of the plurality of devices is based, at least in part, on a combination of the rates of degradation, the predicted workloads and one or more types of the one or more alerts, and wherein the method further comprises performing at least one automated action based, at least in part, on the ranking.

15. The method of claim 1 wherein the steps of the method are executed in real-time responsive to collection of data corresponding to the one or more alerts for respective ones of a plurality of devices.

16. An apparatus comprising:

a processing device operatively coupled to a memory and configured:

to generate a plurality of device trees for respective ones of a plurality of devices in a datacenter, the plurality of device trees respectively comprising a plurality of nodes corresponding to a device, one or more components of the device and one or more alerts associated with the one or more components, the plurality of device trees including at least a first device tree generated for a first device in the datacenter, the first device tree comprising at a first level a root node representing the first device, at a second level a plurality of component nodes each coupled to the root node and each representing a different component of the first device, and at a third level a plurality of alert nodes each coupled to a corresponding one of the component nodes and each representing a different type of alert generated for the component represented by the corresponding component node, the plurality of device trees further including a second device tree generated for a second device in the datacenter, the second device being different than the first device, the second device tree having a root node, component nodes and alert nodes at respective first, second and third levels of the second device tree;

to assign weights to the plurality of nodes of the plurality of device trees, wherein assigning weights comprises, for a given one of the first and second device trees generated for the respective first and second devices, assigning a weight of a first set of weights to the root node, assigning weights of a second set of weights to respective component nodes at the second level of the given device tree, and assigning weights of a third set of weights to respective alert nodes at the third level of the given device tree;

to compute rates of degradation for the respective ones of the plurality of devices based, at least in part, on the assigned weights, wherein for the given device tree, a rate of degradation is computed for the corresponding first or second device based at least in part on total weights of respective ones of the component nodes, wherein the total weight of a particular one of the component nodes is computed at least in part as a function of the weight assigned from the second set of weights to the particular component node and the weights assigned from the third set of weights to respective ones of the alert nodes coupled to the particular component node;

to predict workloads for the respective ones of the plurality of devices using one or more machine learning models;

to generate a ranking of the respective ones of the plurality of devices based, at least in part, on at least one of the rates of degradation and the predicted workloads; and to manage the devices based at least in part on the generated ranking.

17. The apparatus of claim 16 wherein the plurality of nodes for respective ones of the plurality of device trees comprise a root node corresponding to the device, one or more secondary nodes corresponding to the one or more components and extending from the root node, and one or more tertiary nodes corresponding to the one or more alerts and extending from the one or more secondary nodes.

18. The apparatus of claim 17 wherein, in computing the rates of degradation for the respective ones of the plurality of devices, the processing device is configured:

to compute respective total weights of the one or more tertiary nodes extending from respective ones of the one or more secondary nodes;

to compute respective total weights of the respective ones of the one or more secondary nodes based, at least in part, on the respective total weights of the one or more tertiary nodes; and to compute an overall device weight based, at least in part, on the respective total weights of the respective ones of the one or more secondary nodes.

19. An article of manufacture comprising a non-transitory processor-readable storage medium having stored therein program code of one or more software programs, wherein the program code when executed by at least one processing device causes said at least one processing device to perform the steps of:

generating a plurality of device trees for respective ones of a plurality of devices in a datacenter, the plurality of device trees respectively comprising a plurality of nodes corresponding to a device, one or more components of the device and one or more alerts associated with the one or more components, the plurality of device trees including at least a first device tree generated for a first device in the datacenter, the first device tree comprising at a first level a root node representing the first device, at a second level a plurality of component nodes each coupled to the root node and each representing a different component of the first device, and at a third level a plurality of alert nodes each coupled to a corresponding one of the component nodes and each representing a different type of alert generated for the component represented by the corresponding component node, the plurality of device trees further including a second device tree generated for a second device in the datacenter, the second device being different than the first device, the second device tree having a root node, component nodes and alert nodes at respective first, second and third levels of the second device tree;

assigning weights to the plurality of nodes of the plurality of device trees, wherein assigning weights comprises, for a given one of the first and second device trees generated for the respective first and second devices, assigning a weight of a first set of weights to the root node, assigning weights of a second set of weights to respective component nodes at the second level of the given device tree, and assigning weights of a third set of weights to respective alert nodes at the third level of the given device tree;

computing rates of degradation for the respective ones of the plurality of devices based, at least in part, on the assigned weights, wherein for the given device tree, a rate of degradation is computed for the corresponding first or second device based at least in part on total weights of respective ones of the component nodes, wherein the total weight of a particular one of the component nodes is computed at least in part as a function of the weight assigned from the second set of weights to the particular component node and the weights assigned from the third set of weights to respective ones of the alert nodes coupled to the particular component node;

predicting workloads for the respective ones of the plurality of devices using one or more machine learning models;

generating a ranking of the respective ones of the plurality of devices based, at least in part, on at least one of the rates of degradation and the predicted workloads; and managing the devices based at least in part on the generated ranking.

20. The article of manufacture of claim 19 wherein the plurality of nodes for respective ones of the plurality of device trees comprise a root node corresponding to the device, one or more secondary nodes corresponding to the one or more components and extending from the root node, and one or more tertiary nodes corresponding to the one or more alerts and extending from the one or more secondary nodes.

* * * * *